United States Patent
Kratzer et al.

(10) Patent No.: US 9,459,630 B2
(45) Date of Patent: Oct. 4, 2016

(54) SYSTEM AND METHOD FOR CONTROLLING A REMOTE VALVE

(71) Applicant: FISHER CONTROLS INTERNATIONAL LLC, Marshalltown, IA (US)

(72) Inventors: Scott Richard Kratzer, Marshalltown, IA (US); Mitchell Stephen Panther, Marshalltown, IA (US); Davin Scott Nicholas, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 283 days.

(21) Appl. No.: 14/169,916

(22) Filed: Jan. 31, 2014

(65) Prior Publication Data

US 2015/0112491 A1    Apr. 23, 2015

Related U.S. Application Data

(60) Provisional application No. 61/894,254, filed on Oct. 22, 2013.

(51) Int. Cl.
| | |
|---|---|
| *G05D 7/06* | (2006.01) |
| *G05B 15/02* | (2006.01) |
| *H04L 29/08* | (2006.01) |
| *F15B 13/043* | (2006.01) |

(52) U.S. Cl.
CPC ........... *G05D 7/0635* (2013.01); *F15B 13/043* (2013.01); *F15B 13/0431* (2013.01); *G05B 15/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 4,561,470 A | 12/1985 | Bezard et al. | |
| 4,811,221 A * | 3/1989 | Sturman | G05B 19/0426 137/624.12 |
| 6,685,159 B1 * | 2/2004 | Schnell | F15B 13/0426 251/129.04 |
| 2012/0167996 A1 | 7/2012 | Pathak et al. | |
| 2013/0068309 A1 | 3/2013 | Anderson | |
| 2013/0087223 A1 | 4/2013 | Ozzello | |
| 2013/0103989 A1 | 4/2013 | Jensen | |

FOREIGN PATENT DOCUMENTS

| | | |
|---|---|---|
| EP | 2 179 902 | 4/2010 |
| EP | 2530334 A1 | 12/2012 |
| WO | WO-02/17028 | 2/2002 |

OTHER PUBLICATIONS

International Search Report and Written Opinion for corresponding International application No. PCT/US2014/061674, dated Feb. 11, 2015.

(Continued)

*Primary Examiner* — Tuan Dao
(74) *Attorney, Agent, or Firm* — Marshall, Gerstein & Borun LLP

(57) ABSTRACT

A system and method for controlling a remote valve includes temporarily driving or activating a battery-powered pilot valve assembly to place an operatively coupled output valve assembly in a switch position. A processor energizes a bistable valve of the pilot valve assembly to enable a fluid supply to drive the output valve assembly to a desired switch position, whereupon the pilot valve assembly may be de-energized and the switch position of the output valve assembly maintained.

20 Claims, 3 Drawing Sheets

(56) References Cited

OTHER PUBLICATIONS

"Improving Process Efficiency With Wireless Valve Automation," Kurtis Jensen, Valve Magazine, Valve Manufacturers Association, Fall 2012, 3 pages.
"TopWorx™ 4310 Wireless Position Monitor," Product Bulletin 62.3:4310, Nov. 2012, 12 pages.
"TopWorx™ 4310 Wireless Position Monitor, with On/Off Control Option," Instruction Manual, 4310 Position Monitor, Oct. 2012, 64 pages.
"Fisher® 4320 Wireless Position Monitor," Product Bulletin 62.3:4320, Nov. 2012, 12 pages.
"Fisher® 4320 Wireless Position Monitor, with On/Off Control Option," Instruction Manual, 4320 Position Monitor, Oct. 2012, 64 pages.
Press Release, "Emerson Introduces Wireless Position Monitor with On/Off Control for Discrete Valves," http://www2.emersonprocess.com/en-US/news/pr/Pages/1210-Fisher4320.aspx, 2 pages (Jan. 22, 2015).
International Search Report and Written Opinion for corresponding International application No. PCT/US2014/061671, dated Mar. 3, 2015.
International Preliminary Report on Patentability and Written Opinion for corresponding International application No. PCT/US2014/061674, dated Apr. 26, 2016.

\* cited by examiner

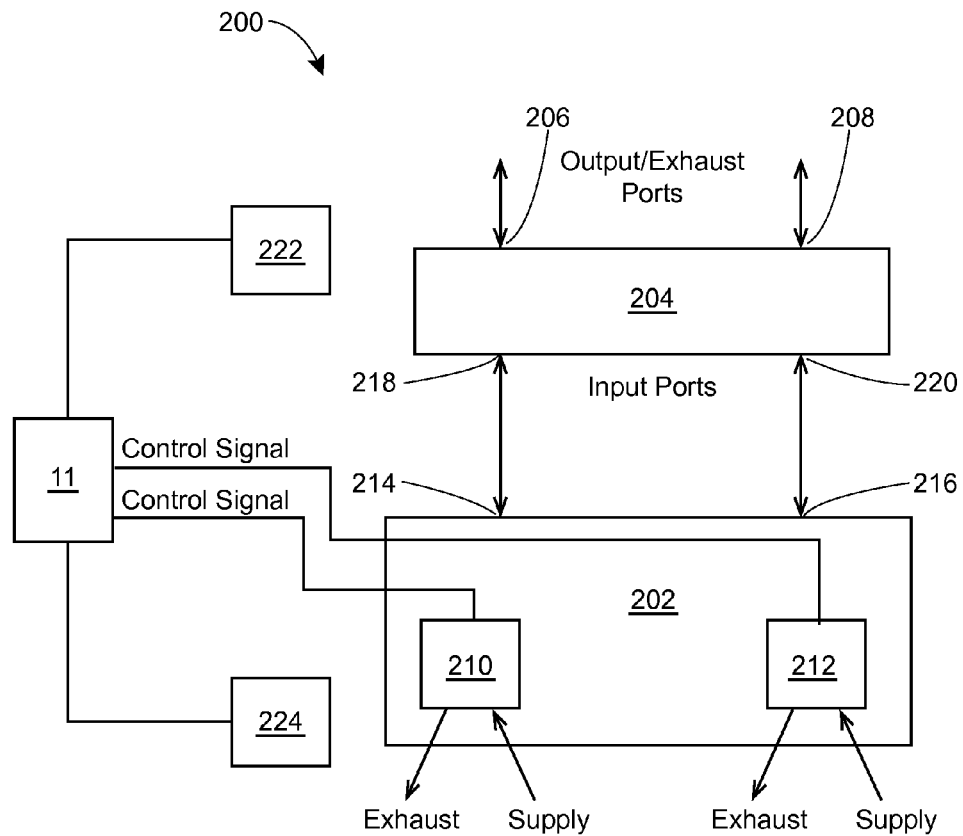
FIG. 2A
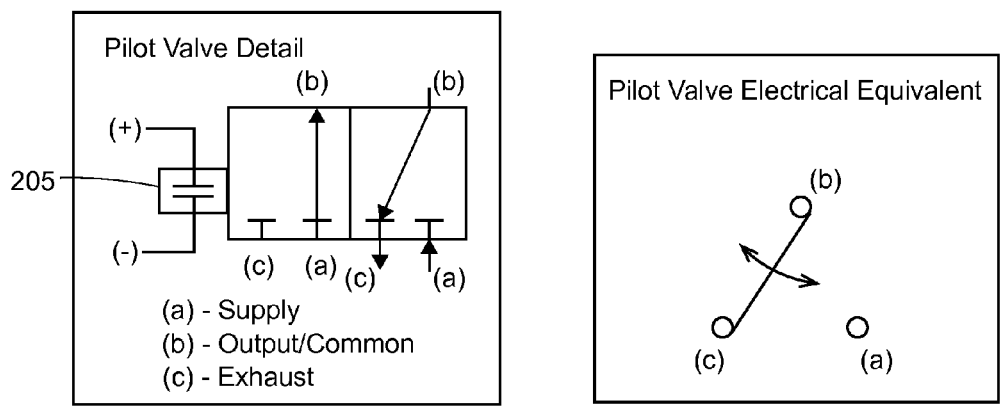
FIG. 2B          FIG. 2C

SYSTEM AND METHOD FOR CONTROLLING A REMOTE VALVE

FIELD OF THE DISCLOSURE

The present disclosure is directed to process control systems and, more particularly, to controlling a remote battery-powered valve.

BACKGROUND

Process control systems, such as distributed or scalable process control systems commonly used in chemical, petroleum or other industrial processes, typically include one or more process controllers communicatively coupled to at least one host or user workstation and to one or more field devices via analog, digital, or combined analog/digital buses. The field devices, which may include, for example, control valves, valve positioners, switches, and transmitters (for example, temperature, pressure, and flow rate sensors), perform functions within the process such as opening or closing valves and measuring process parameters. The process controller receives signals indicative of process measurements made by the field devices and/or other information pertaining to the field devices, and uses this information to implement a control routine to generate control signals, which are sent over the buses to the field devices to control the operation of the process. Information from each of the field devices and the controller is typically made available to one or more applications executed by the user workstation to enable an operator to perform any desired function regarding the process, such as viewing the current state of the process and/or modifying the operation of the process. In the event that a field device fails, the operational state of the entire process control system can be jeopardized.

SUMMARY

One aspect of the present disclosure is directed to a method for controlling a remote pneumatically operated valve implemented within a process control system. The method includes providing a fluid supply to a battery-powered pilot valve assembly that is operatively coupled to a output valve assembly, activating a first pilot valve of the pilot valve assembly to enable the fluid supply to drive the output valve assembly to a first switch position, deactivating the first pilot valve of the pilot valve assembly, and maintaining the output valve assembly in the first switch position.

Another aspect of the present disclosure includes a system for controlling a remote pneumatically operated valve. The system includes a battery-powered pilot valve assembly operatively coupled to an output valve assembly, a processor operatively coupled to a first pilot valve of the battery-powered pilot valve assembly and a second pilot valve of the battery-powered pilot valve assembly. The system includes a memory operatively coupled to the processor, and a control module stored in the memory, wherein the control module, when executed by the processor, activates the first pilot valve to enable a fluid supply to drive the output valve assembly to a first switch position and deactivates the first pilot valve to disable the fluid supply from driving the output valve assembly to the first switch position, wherein the output valve assembly is maintained in the first switch position.

A further aspect of the present disclosure includes a tangible computer readable-medium storing instructions for controlling a remote pneumatically operated valve implemented within a process control system, wherein the instructions, when executed by one or more processors of the control system, cause the one or more processors to activate a first pilot valve of the pilot valve assembly to enable a fluid supply to drive an output valve assembly to a first switch position, deactivate the first pilot valve of the pilot valve assembly, and maintain the output valve assembly in the first switch position.

In further accordance with the inventive aspects described herein, any one or more of the foregoing embodiments may further include any one or more of the following forms.

In one form, the method includes confirming a position of the output valve assembly at the first switch position.

In another form of the method, confirming the position of the output valve assembly includes receiving a position feedback signal from a position sensor located proximate the output valve assembly.

In another form of the method, confirming the position of the output valve assembly includes waiting a prescribed period of time after activating the first pilot valve of the pilot valve assembly.

In another form, the method includes activating a second pilot valve of the pilot valve assembly to enable the fluid supply to drive the output valve assembly to a second switch position, deactivating the second pilot valve of the pilot valve assembly, and maintain the output valve assembly in the second switch position.

In another form, the method includes confirming the position of the output valve assembly at the second switch position.

In another form, the system includes a position sensor operatively coupled to the processor to confirm the position of the output valve assembly at the first switch position before deactivation of the first pilot valve.

In another form, the system includes a timer operatively coupled to the processor to prescribe a time period to wait after activation of the first pilot valve to deactivate the first pilot valve.

In another form, the time period of the system is approximately three seconds or longer.

In another form, the time period of the system is within a range of approximately two to approximately five seconds.

In another form, the control module of the system, when executed by the processor, activates the second pilot valve to enable a fluid supply to drive the output valve assembly to a second switch position, and deactivates the second pilot valve to disable the fluid supply from driving the output valve assembly to the second switch position, wherein the output valve assembly is maintained in the second switch position.

In another form, the first pilot valve and/or the second pilot valve of the system is a piezoelectric valve.

In another form, the output valve assembly of the system includes a bistable rotary spool valve or a bistable sliding spool valve.

In another form, the tangible computer-readable medium includes an additional instruction, that when executed by the one or more processors of the control system, cause the one or more processors to confirm the position of the output valve assembly at the first switch position.

In another form of the tangible computer-readable medium, the one or more processors confirm the position of the output valve assembly at the first switch position by at least receiving a position feedback signal from a position sensor located proximate the output valve assembly.

BRIEF DESCRIPTION OF THE DRAWINGS

FIG. 2A is a schematic representation of an example control valve assembly constructed in accordance with the principles of the present disclosure.

FIG. 2B is a schematic representation of interior details of the pilot valve shown in FIG. 2A.

FIG. 2C is a schematic representation of the electrical equivalent of the pilot valve shown in FIGS. 2A and 2B.

DETAILED DESCRIPTION

Figure 1:
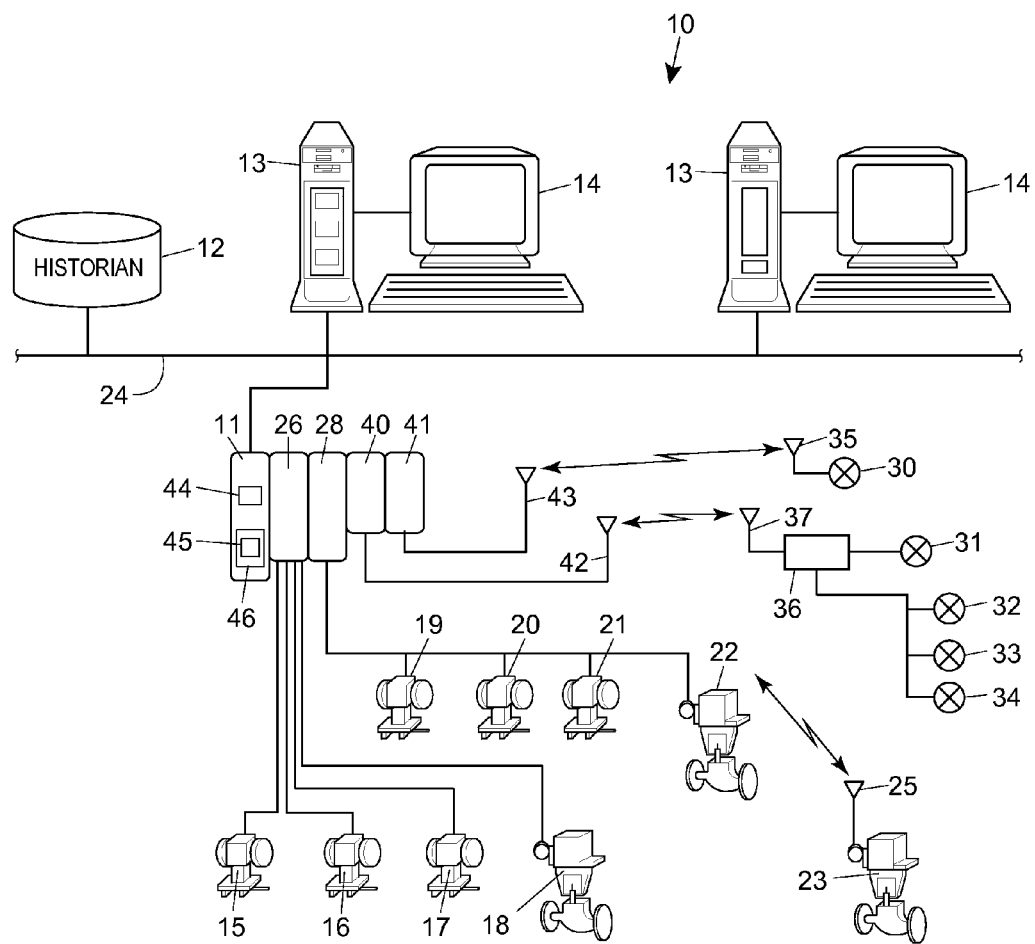
FIG. 1 is a schematic representation of an example process control system having one or more field devices constructed in accordance with the principles of the present disclosure.

Referring now to FIG. 1, a process control system 10 constructed in accordance with one version of the present disclosure is depicted incorporating one or more field devices 15, 16, 17, 18, 19, 20, 21, 22, 23, 30, 31, 32, 33, 34 in communication with a process controller 11. The process controller 11 is communicably coupled to a data historian 12 and one or more user workstations 13. Each workstation 13 includes a user interface 14 to facilitate communication with the process control system 10. The user interface 14 may include one or more devices, such as a display screen, touch-screen, keyboard, and a mouse, for example. So configured, the controller 11 delivers signals to and receives signals from the field devices 15, 16, 17, 18, 19, 20, 21, 22, 23, 30, 31, 32, 33, 34 and the workstations 13 to control the process control system 10.

In additional detail, the process controller 11 of the process control system 10 of the version depicted in FIG. 1 is connected via hardwired communication connections to field devices 15, 16, 17, 18, 19, 20, 21, 22 via input/output (I/O) cards 26 and 28. The data historian 12 may be any desired type of data collection unit having any desired type of memory and any desired or known software, hardware, or firmware for storing data. Moreover, while the data historian 12 is illustrated as a separate device in FIG. 1, it may instead or in addition be part of one of the workstations 13 or another computing device, such as a server. The controller 11, which may be, by way of example, a DeltaV™ controller sold by Emerson Process Management, is communicatively connected to the workstations 13 and to the data historian 12 via a communication network 24 that may be, for example, an internet or Ethernet connection.

The field devices 15, 16, 17, 18, 19, 20, 21, 22 are illustrated as being communicatively connected to the controller 11 via a hardwired communication scheme, which may include the use of any desired hardware, software, and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, 22 may be any types of devices, such as sensors, control valve assemblies, transmitters, positioners, for example, while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices that communicate over a digital bus to the I/O card 28 using Fieldbus protocol communications. Of course, the field devices 15, 16, 17, 18, 19, 20, 21, 22 may conform to any other desired standard(s) or protocols, including any standards or protocols developed in the future.

The process control system 10 depicted in FIG. 1 also includes a number of wireless field devices 23, 30, 31, 32, 33, 34 disposed in the plant to be monitored and/or controlled. The field device 23 is depicted as a control valve assembly including, for example, a control valve, while the field devices 30, 31, 32, 33, 34 are depicted as transmitters, for example, process variable sensors. Wireless communications may be established between the controller 11 and the field devices 23, 30, 31, 32, 33, 34 using any desired wireless communication equipment, including hardware, software, firmware, or any combination thereof now known or later developed. In the version illustrated in FIG. 1, an antenna 25 is coupled to the control valve assembly 23 to perform wireless communications for the control valve assembly 23. Likewise, an antenna 35 is coupled to and is dedicated to facilitate wireless communications for the transmitter 30, while a wireless router or other module 36 having an antenna 37 is coupled to collectively coordinate wireless communications for the transmitters 31, 32, 33, 34. The field devices or associated hardware 23, 30, 31, 32, 33, 34, 36 may implement protocol stack operations used by an appropriate wireless communication protocol to receive, decode, route, encode, and send wireless signals via the antennas 25, 35, 37 to implement wireless communications between the process controller 11 and the control valve assembly 23 and the transmitters 30, 31, 32, 33, 34.

If desired, the control valve assembly 23 may provide measurements made by sensors within the control valve assembly 23 or may provide other data generated by or computed by the control valve assembly 23 to the controller 11 as part of its operation. Of course, as is known, the control valve assembly 23 may also receive control signals from the controller 11 to effect physical parameters, for example, flow, within the overall process. Additionally, the transmitters 30, 31, 32, 33, 34 may constitute the sole link between various process sensors (transmitters) and the process controller 11 and, as such, are relied upon to send accurate signals to the controller 11 to ensure that process performance is not compromised. The transmitters 30, 31, 32, 33, 34 are often referred to as process variable transmitters (PVTs) and may play a significant role in the control of the overall control process.

The process controller 11 is operatively coupled to one or more I/O devices 40, 41, each connected to a respective antenna 42, 43, and the I/O devices and antennas operate as transmitters/receivers to perform wireless communications with the wireless field devices 23, 30, 31, 32, 33, 34 via one or more wireless communication networks. The wireless communications with the field devices 23, 30, 31, 32, 33, 34 may be performed using one or more known wireless communication protocols, such as the WirelessHART® protocol, the Ember protocol, a WiFi protocol, an IEEE wireless standard, etc. Still further, the I/O devices 40, 41 may implement protocol stack operations used by these communication protocols to receive, decode, route, encode, and send wireless signals via the antennas 25, 35, 37, 42, 43 to implement wireless communications between the controller 11 and the control valve assembly 23 and the transmitters 30, 31, 32, 33, 34.

As illustrated in FIG. 1, the controller 11 conventionally includes a processor 44 that implements or oversees one or more process control and/or diagnostic routines 45 (or any module, block, or sub-routine thereof) stored in a memory 46. The process control and/or diagnostic routines 45 stored in the memory 46 may include or be associated with control loops being implemented within the process plant. Generally speaking, and as is generally known, the process controller 11 executes one or more control routines 45 and communicates with the field devices 15, 16, 17, 18, 19, 20, 21, 22, 23, 30, 31, 32, 33, 34, the user workstations 13, and the data historian 12 to control a process in any desired manner.

In one particular configuration, the remote field device 23 may include a control valve assembly that provides a fluid-type output, for example, pneumatic or hydraulic pressure. In some implementations, the field device 23 may be powered by a power source with a finite amount of energy, such as a battery, fuel cell, and a like. To conserve energy, the field device 23 may incorporate or utilize a pilot valve assembly constructed in accordance with the principles of the present disclosure for controlling an output valve via the process controller 11.

Referring now to FIGS. 2A-2C, for the sake of description, the wireless field device 23 from FIG. 1 is shown in FIG. 2A as a control valve assembly 200. The control valve assembly 200 includes a battery-powered pilot valve assembly 202 operatively coupled to an output valve assembly 204. The output valve assembly 204 may be a directional pneumatic control valve that enables fluid to flow in and/or out different paths. The output valve assembly 204 may include a rotary or sliding spool that is mechanically or electrically controlled inside a cylinder. Movement of the spool permits or restricts fluid flow to or from a pair of ports, for example, output ports or exhaust ports 206, 208 of the control valve assembly 200. The first output port 206 and the second output port 208 may cooperate to move an actuator in a first and second direction between a first and second position, for example, to open and close a valve. That is, when fluid flows out of the first exhaust port 206, the actuator may be moved in a first direction to a first switch position, and when fluids flows out of the second exhaust port 208, the actuator may be moved back, or in a second direction, to a second switch position.

The battery-powered pilot valve assembly 202 includes a pair of battery-powered pilot valves 210, 212 operatively coupled to a controller and a processor such as the controller 11 and the processor 44 of the control system 10 in FIG. 1. It is to be understood that although the term "battery-powered" is used to denote that the pilot valves 210, 212 are powered by a battery, other sources of stored energy are included within the description of battery-powered, such as a fuel cell, rechargeable battery, and a like. At least one pilot valve 210, 212 uses or relies on the battery to a greater extent when the pilot valve 210, 212 is "turned on," being driven, or being activated as compared to when the pilot valve 210, 212 is "turned off," not being driven, or not being activated. A piezoelectric valve may be well suited for use as one or both pilot valves 210, 212 in the battery-powered pilot valve assembly 202 because of its low power consumption characteristics; however other types of valves may also be used.

As shown in the FIG. 2B of the pilot valve detail, each pilot valve 210, 212 is operatively coupled to a battery 205. Each pilot valve 210, 212 includes a supply port (a), a common/output port (b), and an exhaust port (c). The common port (b) of a first pilot valve 210 is fluidly coupled to a first output port 214 of the pilot valve assembly 202, which is further coupled to a first input port 218 of the output valve assembly 204. The common port (b) of a second pilot valve 212 is fluidly coupled to a second output port 216 of the pilot valve assembly 202, which is further coupled to a second input port 220 of the output valve assembly 204.

Each pilot valve 210, 212 is also capable of receiving a control signal from the controller 11. In operation, upon receiving the control signal, the pilot valve 210, 212 may be driven or activated to connect the common port (b) to either the supply port (a) or the exhaust port (c), as shown in the pilot valve's 210, 212 electrical equivalent in FIG. 2C. For example, the battery-powered pilot valve 210, 212 may be driven or activated to connect a fluid supply present at the supply port (a) to the common port (b), which will enable the fluid supply to be provided to the respective input port 218, 220 of the output valve assembly 204. Alternatively, each battery-powered pilot valve 210, 212 may be driven or activated to connect the common port (b) to the exhaust port (c), which will allow fluid to drain away from the output valve assembly 204. As such, each pilot valve 210, 212 may respond to an electrical control signal to open/close pneumatic ports that will enable fluid at a supply port (a) to be provided to the output valve assembly 204 or allow fluid to drain away from the output valve assembly 204 to the exhaust port (c). In other words, the opened/closed pneumatic ports of the pilot valve 210, 212 supply and/or exhaust compressed air to the input 218, 220 of the output valve assembly 204, wherein the output valve assembly 204 manipulates its output in a defined manner. The output valve assembly 204, e.g., bistable valve, is able to maintain its output(s) without the need for the pilot valve 210, 212 to provide a constant input to the output valve assembly 204. Thus, once the output valve assembly 204 has reached a stable output or switch position, the pilot valve 210, 212 no longer needs to maintain its output signal to the output valve assembly 204 and thus the electrical control signal transmitted or supplied from the controller 11 to drive or activate the corresponding pilot valve can therefore be discontinued.

In the embodiment of the battery-powered pilot valve assembly 202 depicted in FIG. 2A, the pair of pilot valves 210, 212 are implemented within the pilot valve assembly 202. The first pilot valve 210 is driven or activated by a control signal from the controller 11, which allows a fluid supply to reach the output valve assembly 204 and to move the output valve assembly 204 between first and second positions. In particular, an electrical control signal may be temporarily provided to the first pilot valve 210 for a sufficient amount of time to enable the fluid supply present at the supply port (a) to reach the output valve assembly 204 and for the output valve assembly 204 to be properly positioned. When the output valve assembly 204 is properly positioned, the control signal from the processor is stopped and the pilot valve 210 ceases being driven or activated and the use of electrical energy from the battery power source 205 is significantly reduced or essentially eliminated. To move and reposition the output valve assembly 204, another control signal may be transmitted by the controller 11 to drive or activate the second pilot valve 212 for a sufficient amount of time to enable the fluid supply present at the supply port (a) to reach the output valve assembly 204 and for the output valve assembly 204 to be placed in another position. Similarly, when the control signal from the controller 11 is stopped or not transmitted, the position of the output valve assembly 204 is maintained although the pilot valve 212 ceases being driven or activated, wherein the use of electrical energy from the battery power source 205 is significantly reduced or essentially eliminated.

The pilot valves 210, 212 of the pilot valve assembly 202 are used in conjunction with the output valve assembly 204 to create a pneumatic output for an industrial instrument. That is, the output valve assembly 204 may function as a secondary stage, which allows for the pilot valves 210, 212 in the pilot valve assembly 202, e.g., first stage, to only be driven or activated for brief period of time. In other words, once the output valve assembly 204 has reached a stable output state in response to the output of the pilot valve assembly 202 (for example, one or both of the pilot valves 210, 212) and attained a desired position, the electrical control signal transmitted from the controller 11 to the pilot valves 210, 212 may be stopped or discontinued because the output valve assembly 204 is able to maintain its secondary pneumatic output (see for example, a bistable valve) without the need for the pilot valve(s) 210, 212 to maintain its output. Thus, the control valve assembly 200 provides for temporary driving or activating of the pilot valves 210, 212, which reduces energy consumption of the finite power source 205.

Prior to deactivating or ceasing the driving of the pilot valve of the pilot valve assembly, the processor 11 may first determine whether the output valve of the output valve assembly 204 has reached its intended position. The processor 11 may determine if the output valve has reached its intended position by using a position or motion sensor 222 located near the output valve assembly 204 to determine if the corresponding output valve(s) of the output valve assembly 204 has stopped moving. If the output valve is not being moved, the processor 11 will discontinue transmitting the electrical control signal to the corresponding pilot valve 210, 212. Alternatively, the processor 11 may determine if the output valve(s) has reached its intended position by using a position or motion sensor 224 located near the pilot valve assembly 202 to determine if the corresponding pilot valve 210 and/or 212 has stopped moving or reached a terminus position, which may indicate that the corresponding output valve(s) of the output valve assembly 204 has reached a terminus position. In addition, the processor 11 may determine that the output valve of the output valve assembly 204 has reached its intended position if a period of time, which is sufficient for the output valve(s) to travel between two switch positions, has elapsed since the processor 11 transmitted the control signal to the pilot valve assembly 202 to move the output valve(s).

Figure 3:
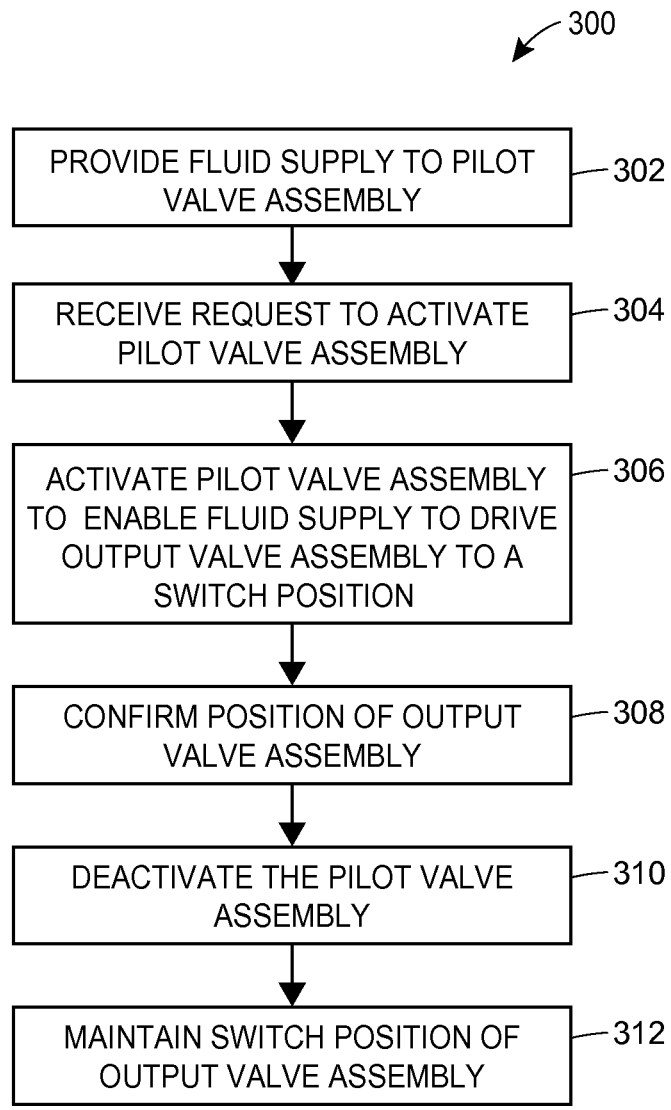
FIG. 3 is a flow diagram of an example method for controlling a valve in accordance with one embodiment of the present disclosure described herein.

A flow diagram 300 of an example method for controlling a remote pneumatically controlled valve capable of being implemented in the process system depicted in FIG. 1 is shown in FIG. 3. The method may be integrated into the module 45 stored in the memory 46 and capable of being executed by the processor 44. A fluid supply is provided to the pilot valve assembly 202 (block 302). Upon receiving a request to move the output valve of the output valve assembly 204 (block 304), a control signal is transmitted from the controller 11 to temporarily drive or activate the battery-powered pilot valve assembly 202 to enable the fluid supply to place the output valve assembly 204 in a desired switch position (block 306). The position of the output valve assembly 204 may move or energize an actuator to open or close another valve. The controller 11 may confirm that the output valve of the output valve assembly has reached its intended position (block 308), whereupon such confirmation the controller may deactivate the pilot valve assembly by ceasing to transmit the control signal to the pilot valve assembly (block 310). Due to the bistable nature of the output valve assembly, the switch position is maintained despite the deactivation of the pilot valve assembly (block 312).

It is apparent from the description above that a system for controlling a valve implementing an output valve assembly in cooperation with a pilot valve assembly as described herein may realize significant power-savings while maintaining the operating integrity of the control system.

Although certain example methods, apparatuses, and articles of manufacture have been described herein, the scope of coverage of this patent is not limited thereto. On the contrary, this patent covers all methods, apparatuses, and articles of manufacture fairly falling within the scope of the appended claims either literally or under the doctrine of equivalents.

What is claimed is:

1. A method for controlling a remote pneumatically operated valve implemented within a process control system, the method comprising:
   providing a fluid supply to a battery-powered pilot valve assembly, the pilot valve assembly operatively coupled to an output valve assembly;
   activating, via a processor, a first pilot valve of the pilot valve assembly to enable the fluid supply to drive the output valve assembly to a first switch position;
   deactivating, via a processor, the first pilot valve of the pilot valve assembly; and
   maintaining the output valve assembly in the first switch position.

2. The method of claim 1, further comprising:
   confirming, via a processor, a position of the output valve assembly at the first switch position.

3. The method of claim 2, wherein confirming the position of the output valve assembly includes receiving, via a processor, a position feedback signal from a position sensor located proximate the output valve assembly.

4. The method of claim 2, wherein confirming the position of the output valve assembly includes waiting, via a processor, a prescribed period of time after activating the first pilot valve of the pilot valve assembly.

5. The method of claim 1, further comprising:
   activating, via a processor, a second pilot valve of the pilot valve assembly to enable the fluid supply to drive the output valve assembly to a second switch position;
   deactivating, via a processor, the second pilot valve of the pilot valve assembly; and
   maintaining the output valve assembly in the second switch position.

6. The method of claim 5, further comprising:
   confirming, via a processor, a position of the output valve assembly at the second switch position.

7. The method of claim 6, wherein confirming the position of the output valve assembly includes receiving, via a processor, a position feedback signal from a position sensor located proximate the output valve assembly.

8. The method of claim 6, wherein confirming the position of the output valve assembly includes waiting, via a processor, a prescribed period of time after activating the first pilot valve of the pilot valve assembly.

9. A system for controlling a remote pneumatically operated valve, the system comprising:
   a battery-powered pilot valve assembly operatively coupled to an output valve assembly;
   a processor operatively coupled to a first pilot valve of the battery-powered pilot valve assembly and a second pilot valve of the battery-powered pilot valve assembly;
   a memory operatively coupled to the processor; and a control module stored in the memory, which when executed by the processor, activates the first pilot valve to enable a fluid supply to drive the output valve assembly to a first switch position, and deactivates the first pilot valve to disable the fluid supply to drive the output valve assembly to the first switch position, wherein the output valve assembly is maintained in the first switch position.

10. The system of claim 9, further comprising:
a position sensor operatively coupled to the processor to confirm position of the output valve assembly at the first switch position before deactivation of the first pilot valve.

11. The system of claim 9, further comprising:
a timer operatively coupled to the processor to prescribe a time period to wait after activation of the first pilot valve to deactivate the first pilot valve.

12. The system of claim 11, wherein the time period is approximately three seconds or longer.

13. The system of claim 11, wherein the time period is within a range of approximately two to approximately five seconds.

14. The system of claim 9, wherein the control module, when executed by the processor, activates the second pilot valve to enable a fluid supply to drive the output valve assembly to a second switch position, and deactivates the second pilot valve to disable the fluid supply from driving the output valve assembly to the second switch position, and wherein the output valve assembly is maintained in the second switch position.

15. The system of claim 9, wherein the first pilot valve and/or the second pilot valve is a piezoelectric valve.

16. The system of claim 9, wherein the output valve assembly includes a bistable rotary spool valve or a bistable sliding spool valve.

17. A tangible non-transitory computer-readable medium storing instructions for controlling a remote pneumatically operated valve implemented within a process control system, wherein the instructions, when executed by one or more processors of the control system, cause the one or more processors to:
activate a first pilot valve of the pilot valve assembly to enable a fluid supply to drive an output valve assembly to a first switch position;
deactivate the first pilot valve of the pilot valve assembly; and
maintain the output valve assembly in the first switch position.

18. The tangible, computer-readable medium of claim 17, further comprising an additional instruction, that when executed by the one or more processors of the control system, cause the one or more processors to:
confirm position of the output valve assembly at the first switch position.

19. The tangible, computer-readable medium of claim 18, wherein the one or more processors confirm position of the output valve assembly at the first switch position by at least receiving a position feedback signal from a position sensor located proximate the output valve assembly.

20. The tangible, computer-readable medium of claim 18, wherein the one or more processors confirm position of the output valve assembly at the first switch position by at least waiting a prescribed period of time after the first pilot valve of the pilot valve assembly has been activated.

* * * * *

UNITED STATES PATENT AND TRADEMARK OFFICE
CERTIFICATE OF CORRECTION

PATENT NO. : 9,459,630 B2  
APPLICATION NO. : 14/169916  
DATED : October 4, 2016  
INVENTOR(S) : Scott Richard Kratzer et al.

Page 1 of 1

It is certified that error appears in the above-identified patent and that said Letters Patent is hereby corrected as shown below:

In the Specification

At Column 1, Line 66, "computer readable-medium" should be -- computer-readable medium --.

At Column 4, Line 28, "23, 30, 31, 32, 33, 34, 36" should be -- 23, 30, 31, 32, 33, 34 --.

At Column 5, Line 41, "flows" should be -- flow --.

At Column 7, Line 23, "processor 11" should be -- processor 44 --.

At Column 7, Lines 25-26, "processor 11" should be -- processor 44 --.

At Column 7, Line 31, "processor 11" should be -- processor 44 --.

At Column 7, Line 33, "processor 11" should be -- processor 44 --.

At Column 7, Line 41, "processor 11" should be -- processor 44 --.

At Column 7, Line 45, "processor 11" should be -- processor 44 --.

In the Claims

At Column 10, Line 17, "The tangible, computer-readable medium" should be -- The tangible non-transitory computer-readable medium --.

At Column 10, Line 23, "The tangible, computer-readable medium" should be -- The tangible non-transitory computer-readable medium --.

At Column 10, Line 28, "The tangible, computer-readable medium" should be -- The tangible non-transitory computer-readable medium --.

Signed and Sealed this  
Twenty-third Day of April, 2019

Andrei Iancu  
*Director of the United States Patent and Trademark Office*